Jan. 30, 1945. R. M. RANDALL ET AL 2,368,378
RIVET SQUEEZER
Filed April 23, 1941 2 Sheets-Sheet 2
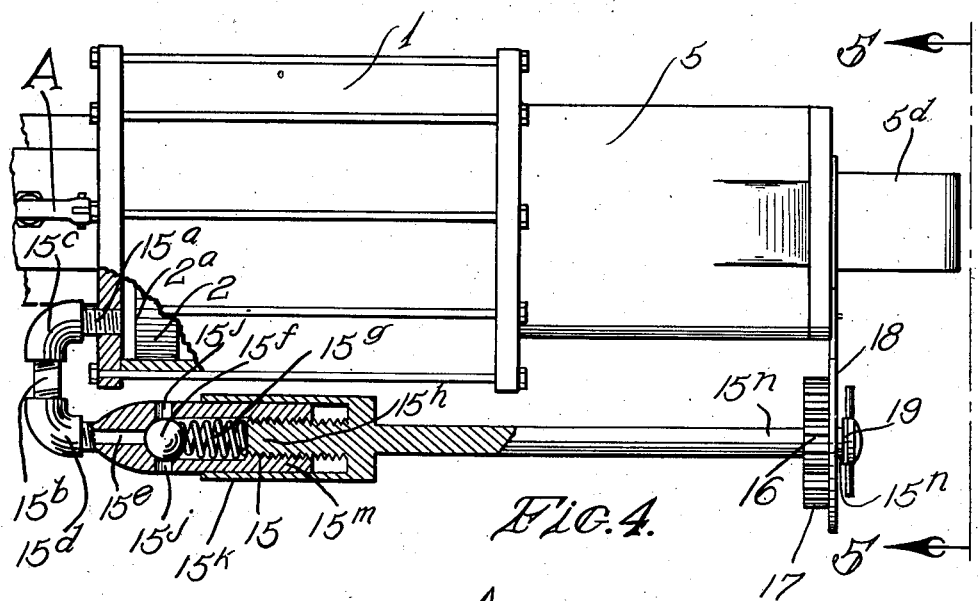
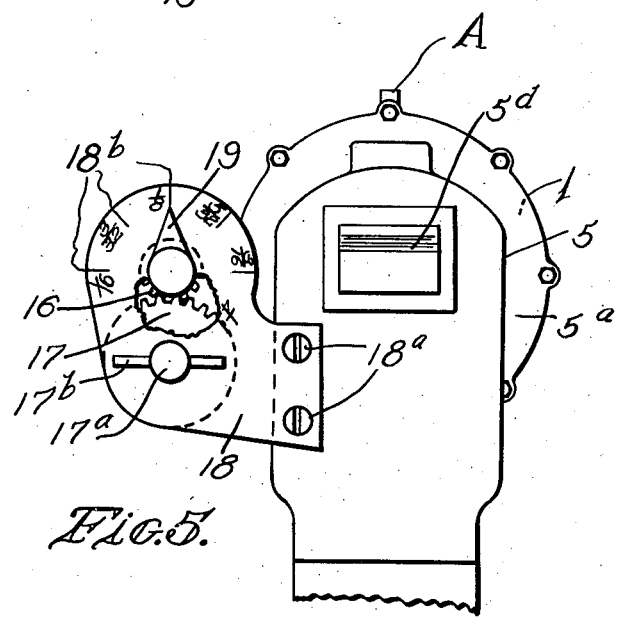
INVENTORS.
Robert M. Randall and
Burton C. Mandeville
BY A. B. Bowman
ATTORNEY.

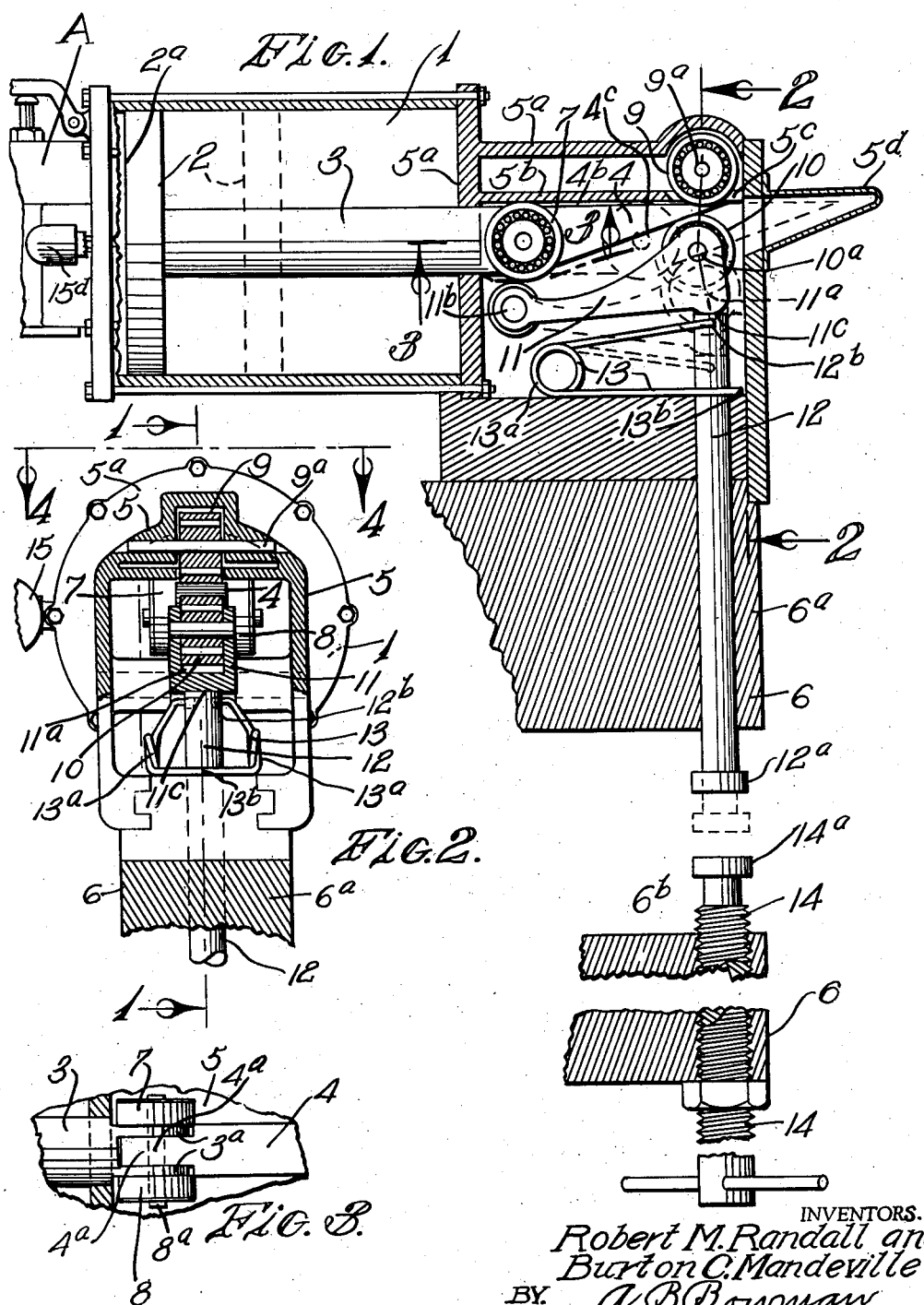

Patented Jan. 30, 1945

2,368,378

UNITED STATES PATENT OFFICE 2,368,378

RIVET SQUEEZER

Robert M. Randall and Burton C. Mandeville, San Diego, Calif.

Application April 23, 1941, Serial No. 389,876

5 Claims. (Cl. 78—48)

Our invention relates to a rivet squeezer, more particularly a rivet squeezer which is arranged to clinch rivets of various sizes and lengths and the objects of our invention are:

First, to provide a rivet squeezer of this class in which the rivet squeezing plunger is reciprocally mounted and is so actuated that it exerts an equal amount of pressure on the rivets being squeezed at various adjusted positions of said rivet relatively with said rivet squeezing plunger;

Second, to provide a rivet squeezer of this class in which a piston actuated wedge is shiftably operated between a stationary roller and a shiftable roller for imparting a uniform gradual pressure on said shiftable roller at various positions of said wedge relatively with said rollers;

Third, to provide a rivet squeezer of this class in which a piston operated wedge in operative relation with a rivet squeezing plunger is controlled by a pressure valve positioned at the pressure side of said piston whereby successive rivets being squeezed by our rivet squeezer are uniformly clinched to a predetermined form;

Fourth, to provide a rivet squeezer of this class in which a dial in connection with the pressure valve of our rivet squeezer affords definite adjusting graduations corresponding to various diameter sized rivets whereby said dial may be set for a predetermined pressure which will clinch a certain diameter sized rivet in our rivet squeezer;

Fifth, to provide a rivet squeezer of this class in which a number of successive rivets may be satisfactorily clinched to a certain predetermined form automatically and in uniform relation with each other so that the rivets do not require inspection;

Sixth, to provide a novel rivet squeezer of this class;

Seventh, to provide a rivet squeezer of this class which is very simple to operate and requires a relatively small amount of attention in the clinching operation of rivets thereby; and Eighth, to provide a rivet squeezer of this class which is very simple and economical of construction, efficient in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary sectional view of our rivet squeezer taken from the line 1—1 of Fig. 2 and showing parts and portions in elevation to facilitate the illustration; Fig. 2 is a fragmentary sectional view taken from the line 3—3 of Fig. 1; showing parts and portions in elevation to facilitate the illustration; Fig. 3 is a fragmentary sectional view taken from the line 3—3 of Fig. 1; Fig. 4 is a fragmentary top or plan view of our rivet squeezer taken from the line 4—4 of Fig. 2 showing portions broken away and in section to facilitate the illustration and Fig. 5 is a fragmentary front elevational view of our rivet squeezer taken from the line 5—5 of Fig. 4 showing portions broken away to facilitate the illustration.

Similar characters of reference refer to similar parts and portions throughout the several views of the drawings:

The pressure cylinder 1, piston 2, piston rod 3, wedge member 4, casing 5, yoke 6, piston rod guiding rollers 7 and 8, wedge guiding roller 9, shiftable roller 10, roller supporting lever 11, rivet squeezing plunger 12, plunger supporting spring 13, adjusting screw 14, pressure regulating valve 15, valve operating gears 16 and 17, dial and bracket member 18 and the dial pointer 19 constitute the principal parts and portions of our rivet squeezer.

The pressure cylinder 1 is arranged to confine the piston 2, as shown in Fig. 1 of the drawings, and this cylinder 1 is a substantially conventional cylinder in which the piston 2 is reciprocally mounted in the conventional manner, as shown in Fig. 1 of the drawings. In communicative relation with the interior of the cylinder 1 at the pressure side of the piston 2 is a valve mechanism A, which is no part of our present invention. This valve mechanism A is arranged to admit fluid under pressure into the cylinder 1 at the pressure side 2a of the piston 2 for forcing the piston toward the casing 5, as shown best in Fig. 1 of the drawings. This valve mechanism A is provided with means for operating the piston 2 in both directions in the pressure cylinder 1 by fluid under pressure, all of which is conventional and no part of our present invention.

The piston rod 3 is connected with the piston 2 and is a cylindrically shaped rod reciprocally mounted in the end portion 5a of the casing 5, as shown best in Fig. 1 of the drawings. It will be noted that the end portion 5a of the casing 5 forms a partial closure for the end of the cylinder 1. The piston rod 3 is provided with spaced tongue portions 3a at its opposite end from the piston 2, as shown best in Fig. 3 of the drawings.

Positioned intermediate these tongue portions 3a is the end portion 4a of the wedge member 4. Positioned at opposite sides of the end portion 4a of the wedge member 4 and outwardly of the tongue portions 3a of the piston rod 3 are the piston rod guiding rollers 7 and 8. These piston rod guiding rollers 7 and 8 are mounted on an axle 8a which is inserted through the tongue portions 3a of the piston rod 3 and the end portion 4a of the wedge member 4, all as shown best in Figs. 1 and 3 of the drawings. It will be obvious that the end portion 4a of the wedge member 4 is pivotally mounted on the axle 8a and is arranged in pivotal relation with the tongue portions 3a of the piston rod 3. As shown in Fig. 1 of the drawings, this wedge member 4 is substantially triangular in shape and is provided with straight, flat side portions 4b and 4c arranged to engage the wedge guiding roller 9 and the shiftable roller 10 respectively. As shown in Fig. 1 of the drawings, the pointed end of the wedge member 4 is positioned intermediate the wedge guiding roller 9 and the shiftable roller 10.

The wedge guiding roller 9 is stationarily mounted on an axle 9a which is arranged in fixed relation with the casing 5, as shown best in Figs. 1 and 2 of the drawings. The casing 5 is provided with a flat plate-like portion 5b which forms a track which is arranged to be engaged by the piston rod guiding rollers 7 and 8 at their upper sides, as shown best in Fig. 1 of the drawings. The wedge guiding roller 9 extends through a slotted portion 5c in the plate-like portion 5b, as shown best in Fig. 1 of the drawings, maintaining the upper side 4b of the wedge member 4 in slight spaced relation from the lower side of the plate-like track portion 5b of the casing member 5, all as shown best in Fig. 1 of the drawings.

The shiftable roller 10 is supported on the roller supporting lever 11 by means of the axle member 10a. As shown in Fig. 2 of the drawings, the roller supporting lever 11 is provided with a recess portion 11a in which the shiftable roller 10 is mounted and arranged to freely revolve.

The roller supporting lever 11 is pivotally mounted on a bolt 11b which is fixed in relation with the casing 5, as shown best in Figs. 1 and 2 of the drawings. The roller supporting lever 11 is provided with a cam portion 11c beneath the recess portion 11a, which cam portion 11c is arranged to engage the upper end of the rivet squeezing plunger 12, all as shown best in Figs. 1 and 2 of the drawings.

The rivet squeezing plunger 12 is a substantially conventional rod-like reciprocally mounted plunger arranged to engage rivets at its end portions 12a in opposed relation to the end portion 14a of the adjusting screw 14.

The adjusting screw 14 is arranged in screw-threaded adjustable relation with the yoke 6 which is a stationarily mounted substantially U-shaped frame member. This yoke 6 is conventional and forms a rigid support for the casing 5 together with the cylinder 1 and connecting mechanism. This yoke 6, as shown in Fig. 1 of the drawings, is shown fragmentarily and the upper portion 6a in which the rivet squeezing plunger 12 is mounted is integral with the lower portion 6b in which the adjusting screw 14 is mounted providing a rigid structure for holding the adjusting screw 14 in certain relation with the rivet squeezing plunger 12 for accurately clinching rivets therebetween.

The plunger supporting spring 13 is provided with opposed resilient coil portions 13a and the opposite ends of this plunger supporting spring 13 are positioned in recess portions 12b in opposite side of the upper end of the rivet squeezing plunger 12, as shown best in Figs. 1 and 2 of the drawings. The middle portion 13b of this plunger supporting spring 13 is positioned around the rivet squeezing plunger 12, as shown best in Figs. 1 and 2 of the drawings.

The pressure regulating valve 15 is mounted at one side of the pressure cylinder 1 and is in communication with the interior of the pressure cylinder 1 at the pressure side 2a of the piston 2 as shown best in Fig. 4 of the drawings. Intercommunicating with the cylinder 1 and the pressure regulating valve 15 are the nipples 15a and 15b in connection with the elbows 15c and 15d. These nipples 15a and 15b, together with the elbows 15c and 15d, are substantially conventional hollow tubular conductor members and are arranged to support one end of the pressure regulating valve 15. This pressure regulating valve 15 is provided with an opening 15e therein communicating with the interior of the cylinder 1. Positioned in communicative relation with this opening 15e is a ball valve member 15f which is supported by the compression spring 15g which is held in compression by the screw 15h, all as shown best in Fig. 4 of the drawings. The ball valve member 15f is arranged to stop the passage of fluid outwardly from the cylinder 1 through the opening 15e, in accordance with the compression of the spring 15g. Positioned in communicative relation with the ball valve 15f at opposite sides thereof are openings 15j arranged to conduct fluid outwardly from the opening 15e when the ball valve 15f is pressed backwardly toward the screw 15h by predetermined pressure of fluid in the cylinder 1. Integral with the screw 15h is a hollow cylindrical portion 15k arranged in surrounding relation with the casing portion 15m of the pressure regulating valve 15.

Integral with the screw 15h is a shaft 15n on which is fixed the valve operating gear 16, as shown best in Figs. 4 and 5 of the drawings.

The dial and bracket member 18 is secured on the casing 5 by means of the screws 18a and this dial and bracket member 18 forms a journal for the extending end of the shaft 15n and journal for the shaft 17a of the valve operating gear 17, as shown best in Fig. 5 of the drawings.

As shown in Fig. 5 of the drawings, the valve operating gears 16 and 17 are arranged in meshed relation with each other and the shaft 17a of the valve operating gear 17 is provided with a handle 17b for use in turning the valve operating gears 16 and 17, together with the shaft 15n for adjusting the tension of the compression spring 15g by means of the screw 15h.

Secured on the extended end of the shaft 15n at the opposite side of the dial and bracket 18 from the valve operating gear 16 is the dial pointer 19. This dial pointer 19 is arranged for use in cooperative relation with the dial designations 18b which are for use in setting the tension of the compression spring 15g upon the ball valve member 15f to correspond with a predetermined pressure in the cylinder 1 for squeezing various sized rivets the sizes of which are numerically indicated on the dial and bracket member 18 by the designations 18b.

The operation of our rivet squeezer is substantially as follows: When it is desired to squeeze rivets and clinch the same by our rivet squeezer, the operator thereof proceeds as follows: The operator must first determine the diameter size of rivets which he desires to squeeze intermediate the rivet squeezing plunger 12 and the adjusting screw 14 of our rivet squeezer. If the operator of our rivet squeezer desires to squeeze and clinch rivets which are one-eighth of an inch in diameter, for example, the operator sets the dial pointer 19 in relation with the designation 18b on the dial and bracket member 18 corresponding to the designation mark 1/8. When the dial pointer 19 points toward the designation mark 1/8, the screw 15h is positioned in certain relation with the compression spring 15g providing a certain pressure on the ball valve 15f whereby the pressure in the cylinder 1 against the piston 2 is automatically released at a predetermined point so that an individual setting of the dial pointer 19 for each different size of rivet, makes adjustment of the pressure regulating valve 15 corresponding to the pressure required to properly squeeze and clinch various sized rivets. When the operator has set the pressure regulating valve 15 for a certain sized rivet, fluid under pressure is admitted into the cylinder 1 at the side 2a of the piston 2 by means of the valve mechanism A and the piston 2 is shifted toward the casing 5 forcing the wedge member 4 between the wedge guiding roller 9 and the shiftable roller 10 pivoting the roller supporting lever 11 on the bolt 11b and forcing the rivet squeezing plunger 12 downwardly into engagement with the rivet being squeezed. When the pressure in the cylinder 1 against the piston 2 reaches a predetermined point, the ball valve member 15f is forced toward the screw 15h and the fluid pressure is released through the opening 15j in the pressure regulating valve casing member 15m.

It will be here noted that the wedge member 4 intermediate the wedge guiding roller 9 and the shiftable roller 10 exerts an equal pressure on the shiftable roller 10 at any longitudinally shifted relation of the wedge member 4 relatively with the shiftable roller 10 and the wedge guiding roller 9.

It will be obvious that when the pressure regulating valve 15 is set to release the pressure in the cylinder 1 at a predetermined point, the rivet squeezing plunger 12 exerts a certain predetermined pressure on the rivet intermediate the portion 12a of the rivet squeezing plunger 12 and the portion 14a of the adjusting screw 14, as shown best in Fig. 1 of the drawings. The adjusting screw 14 may be positioned in variously adjusted relation with the rivet squeezing plunger 12 without changing the effect of the rivet squeezing plunger 12 on the rivet being squeezed intermediate the adjusting screw 14 and the rivet squeezing plunger 12. The pressure on the rivet being squeezed is substantially the same whether the piston 2 moves its full stroke or only a short distance in the cylinder 1 providing an arrangement whereby the operator merely sets the dial pointer 19 in corresponding relation with the desired rivet size and proceeds to squeeze rivets intermediate the rivet squeezing plunger 12 and the adjusting screw 14. As indicated by dash lines in Fig. 1 of the drawings, the wedge member 4 passes between the wedge guiding roller 9 and the shiftable roller 10 and extends outwardly through an opening in the casing member 5 which is covered by the cover member 5d.

With each reciprocal operation of the rivet squeezing plunger 12 toward the adjusting screw 14, the plunger supporting spring 13 is compressed. As the piston 2 is operated in the reverse direction toward the valve mechanism A, the plunger supporting spring 13 forces the rivet squeezing plunger 12, together with the roller supporting lever 11, upwardly to substantially the solid line position, as shown in Fig. 1 of the drawings.

It will be here noted that the valve mechanism A is a substantially conventional structure and is no part of my present invention and that this valve mechanism A, is arranged to force the piston 2 in both directions in the cylinder 1, as indicated by dash lines in Fig. 1 of the drawings.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a rivet squeezer of the class described, the combination of a pressure cylinder, a piston reciprocally mounted in said pressure cylinder, a wedge member with opposed straight sides its full length pivotally connected at its one end with said piston, guide rollers carried by and on opposite sides of said pivoted end, guide means for said rollers, a roller supporting lever pivotally mounted in substantial alignment with said wedge member provided with a roller at its free end engageable with one straight side of said wedge member, and a rivet squeezing plunger in operative relation with said lever adjacent said roller.

2. In a rivet squeezer of the class described, the combination of a pressure cylinder, a piston reciprocally mounted in said pressure cylinder, a wedge member with opposed straight sides its full length pivotally connected at its one end with said piston, guide rollers carried by and on opposite sides of said pivoted end, guide means for said rollers, a roller supporting lever pivotally mounted in substantial alignment with said wedge member provided with a roller at its free end engageable with one straight side of said wedge member, a rivet squeezing plunger in operative relation with said lever adjacent said roller, and a fixed positioned wedge guiding roller at the opposite straight side of said wedge member in opposed relation with said rivet squeezing plunger.

3. In a rivet squeezer of the class described, the combination of a pressure cylinder, a piston reciprocally mounted in said pressure cylinder, a wedge member with opposed straight sides its full length pivotally connected at its one end with said piston, guide roller means in connection with said pivoted end, guide means for said roller means. a roller supporting lever pivotally mounted in substantial alignment with said wedge member provided with a roller at its free end engageable with one straight side of said wedge member, and a rivet squeezing plunger in operative relation with said lever adjacent said roller.

4. In a rivet squeezer of the class described, the combination of a pressure cylinder, a piston reciprocally mounted in said pressure cylinder, a wedge member with opposed straight sides its full length pivotally connected at its one end with said piston, guide roller means in connection with said pivoted end, guide means for said roller means, a roller supporting lever pivotally mounted in substantial alignment with said wedge member provided with a roller at its free end engageable with one straight side of said wedge member, a rivet squeezing plunger in operative relation with said lever adjacent said roller, and a stationary wedge guiding roller at the opposite straight side of said wedge member in opposed relation with said roller on the free side of said pivotally mounted lever.

5. In a rivet squeezer, a casing, a power piston-rod movable into said casing, a partition in the casing above the path of movement of the rod, a wedge member having a lower wedge and being pivotally connected to and movable with the rod, guide rollers carried by and on opposite sides of the mounting for the wedge member, said guide rollers moving at all times in contact with said partition, a pressure roll mounted in the casing remote from the guide rollers, said pressure roll being at all times in contact with the upper surface of the wedge member, an operating lever pivotally mounted at one end in the casing below the guide rollers, the free end of the lever terminating substantially in line with the pressure roll, a roller carried by the free end of the lever in vertical alinement with the pressure roll and at all times in contact with the lower wedging surface of the wedging member, and a rivet squeezing plunger operated in the movement of said lever, the operative movement of the piston-rod causing the wedge surface of the wedge member to vertically displace the free end of the lever to operate the squeezing plunger, the guide rollers constantly approaching the pressure roll during such operation and serving to increase the resistance of the wedge member against upward displacement throughout a length proportionate with and commensurate to the operative stroke of the wedging surface of the wedge member relative the free end of the lever.

ROBERT M. RANDALL.
BURTON C. MANDEVILLE.